(12) United States Patent
Magee

(10) Patent No.: US 11,968,955 B2
(45) Date of Patent: Apr. 30, 2024

(54) LITTER HOUSING ASSEMBLY

(71) Applicant: Melinda Magee, Knightstown, IN (US)

(72) Inventor: Melinda Magee, Knightstown, IN (US)

(*) Notice: Subject to any disclaimer, the term of this patent is extended or adjusted under 35 U.S.C. 154(b) by 133 days.

(21) Appl. No.: 17/843,357

(22) Filed: Jun. 17, 2022

(65) Prior Publication Data
US 2023/0404024 A1 Dec. 21, 2023

(51) Int. Cl.
*A01K 1/01* (2006.01)

(52) U.S. Cl.
CPC .................................. *A01K 1/011* (2013.01)

(58) Field of Classification Search
CPC ............................. A01K 1/011; A01K 1/0114
See application file for complete search history.

(56) References Cited

U.S. PATENT DOCUMENTS

| 3,734,057 A | | 5/1973 | Lee | |
|---|---|---|---|---|
| 4,029,048 A | | 6/1977 | Gershbein | |
| D272,569 S | | 2/1984 | Argentine | |
| 4,527,511 A | * | 7/1985 | Richards | A01K 1/011 119/673 |
| 4,593,645 A | * | 6/1986 | Dingler | A01K 1/011 119/165 |
| 5,148,767 A | * | 9/1992 | Torchio | A01K 1/035 119/484 |
| 5,148,771 A | * | 9/1992 | Schuett | A01K 1/01 119/479 |
| 5,167,202 A | * | 12/1992 | Bradford | A01K 1/035 119/484 |
| 5,184,574 A | | 2/1993 | Kirk | |
| 5,842,438 A | * | 12/1998 | Messmer | A01K 13/002 119/484 |
| 5,996,533 A | * | 12/1999 | Gordon | A01K 1/011 119/166 |
| 6,453,844 B1 | | 9/2002 | Janzen | |
| 10,463,016 B2 | | 11/2019 | Kfoury | |
| 2016/0295828 A1 | | 10/2016 | Fenwick | |
| 2018/0249671 A1 | * | 9/2018 | Roh | B01D 35/02 |

FOREIGN PATENT DOCUMENTS

WO WO2016149221 9/2016

* cited by examiner

*Primary Examiner* — Monica L Perry
*Assistant Examiner* — Nicole Paige MacCrate

(57) ABSTRACT

A litter housing assembly includes a housing that has an entry thereby facilitating a feline to enter the housing. The housing is positioned against an exterior wall of the building having the entry being aligned with a window in the exterior wall. A drip pan is positioned in the housing and cat litter is positioned on the drip pan to facilitate the feline to urinate and defecate in the cat litter. A threshold extends away from the housing thereby facilitating the threshold to rest on a sill of the window in the exterior wall of the building and a box is coupled to the threshold. A fluid output is integrated into the box and a hose is fluidly attached to the fluid output to spray a fluid onto the cat litter for washing the cat litter.

9 Claims, 6 Drawing Sheets

LITTER HOUSING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to litter housing devices and more particularly pertains to a new litter housing device that is positioned in a window of a building to facilitate a feline to urinate and defecate outdoors. The device includes a housing and a foraminous drip pan positioned in the housing upon which cat litter is positioned. The device includes a threshold extending away from the housing and a box attached to the threshold. The threshold is positioned on a window sill such that the box is positioned indoors and the housing is positioned outdoors. A hose is integrated into the box and the hose is fluidly coupled to a fluid source for rinsing the cat litter in the drip pan.

(2) Description of Related Art Including Information Disclosed Under 37 CFR 1.97 and 1.98

The prior art relates to litter housing devices including a pet toilet which includes a box and a spray bar integrated into the box for washing the box. The prior art discloses a combination pet carrier and litter box device which includes a housing with an entry and a plurality of vents for ventilating the housing. The prior art discloses a litter box that includes a drip pan and a drain pipe. The prior art discloses a litter box device that includes a sloped lower wall and a spray bar for spraying a fluid onto the sloped lower wall. The prior art discloses a litter box device that includes a housing and a ventilation pipe which extends between the housing and an exterior wall of a building. The prior art discloses a litter box device that includes a housing, a chute integrated into the housing and a drip pan positioned beneath the chute for capturing cat litter released through the chute.

BRIEF SUMMARY OF THE INVENTION

An embodiment of the disclosure meets the needs presented above by generally comprising a housing that has an entry thereby facilitating a feline to enter the housing. The housing is positioned against an exterior wall of the building having the entry being aligned with a window in the exterior wall. A drip pan is positioned in the housing and cat litter is positioned on the drip pan to facilitate the feline to urinate and defecate in the cat litter. A threshold extends away from the housing thereby facilitating the threshold to rest on a sill of the window in the exterior wall of the building and a box is coupled to the threshold. A fluid output is integrated into the box and a hose is fluidly attached to the fluid output to spray a fluid onto the cat litter for washing the cat litter.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
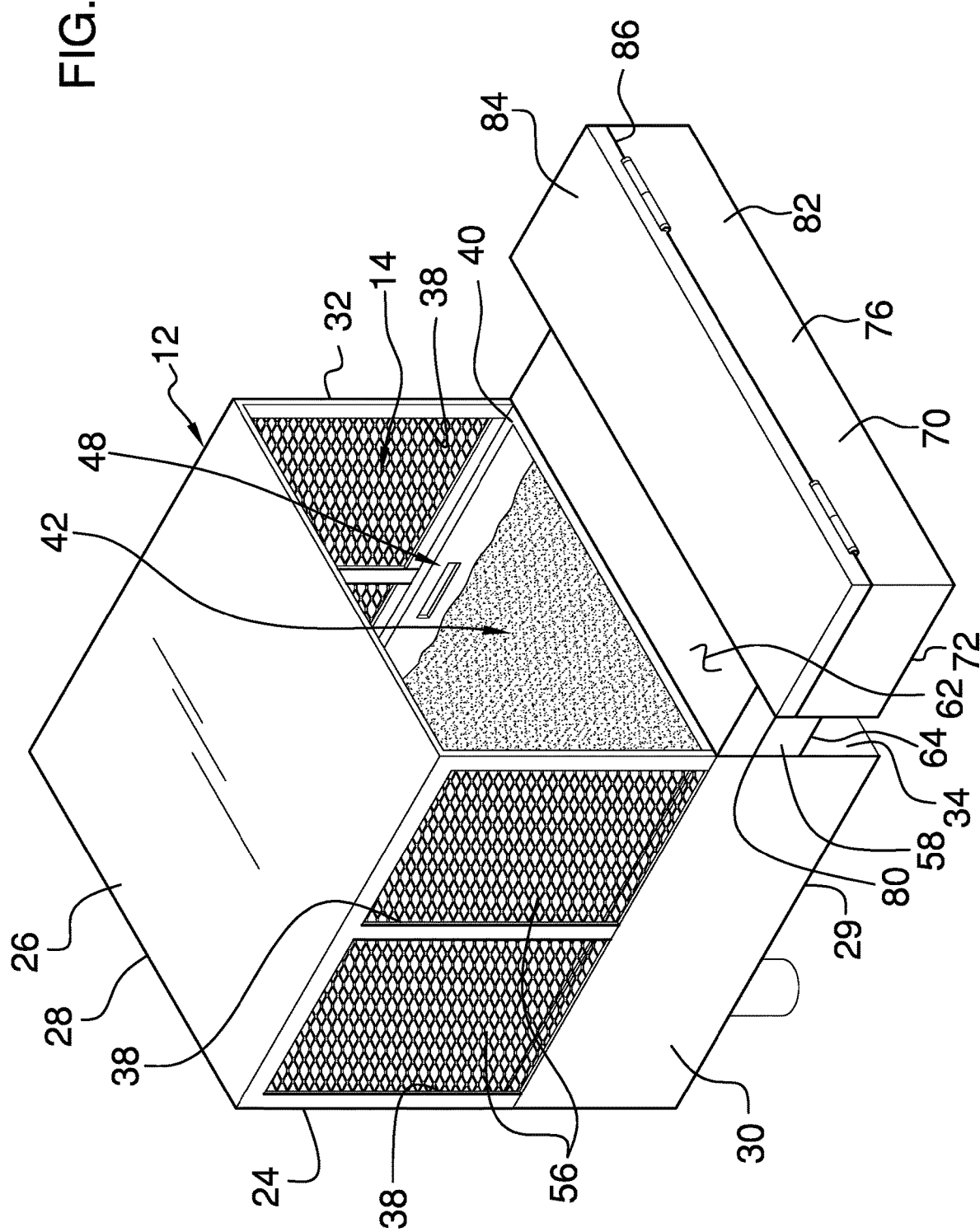
FIG. 1 is a front perspective view of a litter housing assembly according to an embodiment of the disclosure.
Figure 2:
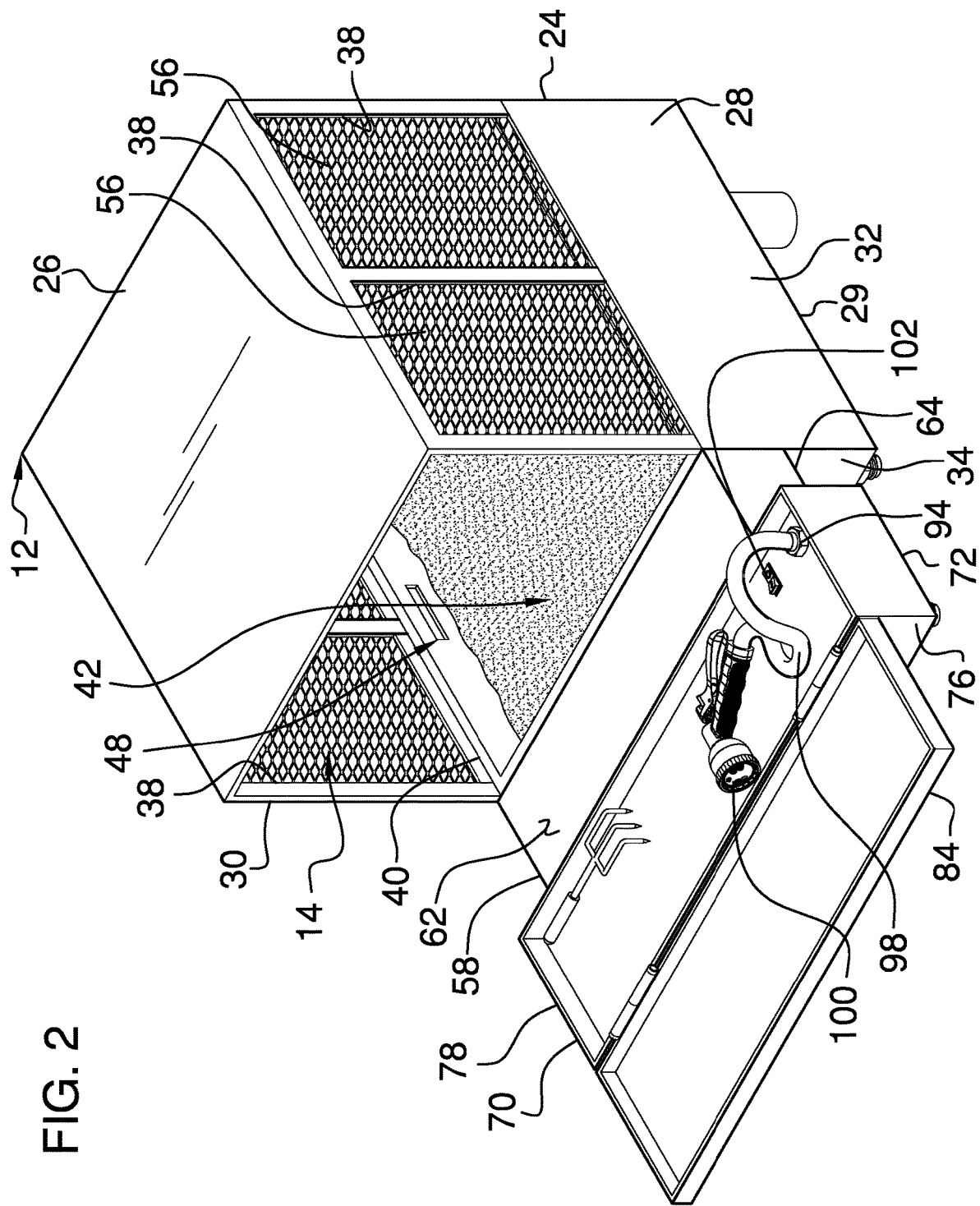
FIG. 2 is a front perspective view of an embodiment of the disclosure showing a lid in an open position.
Figure 3:
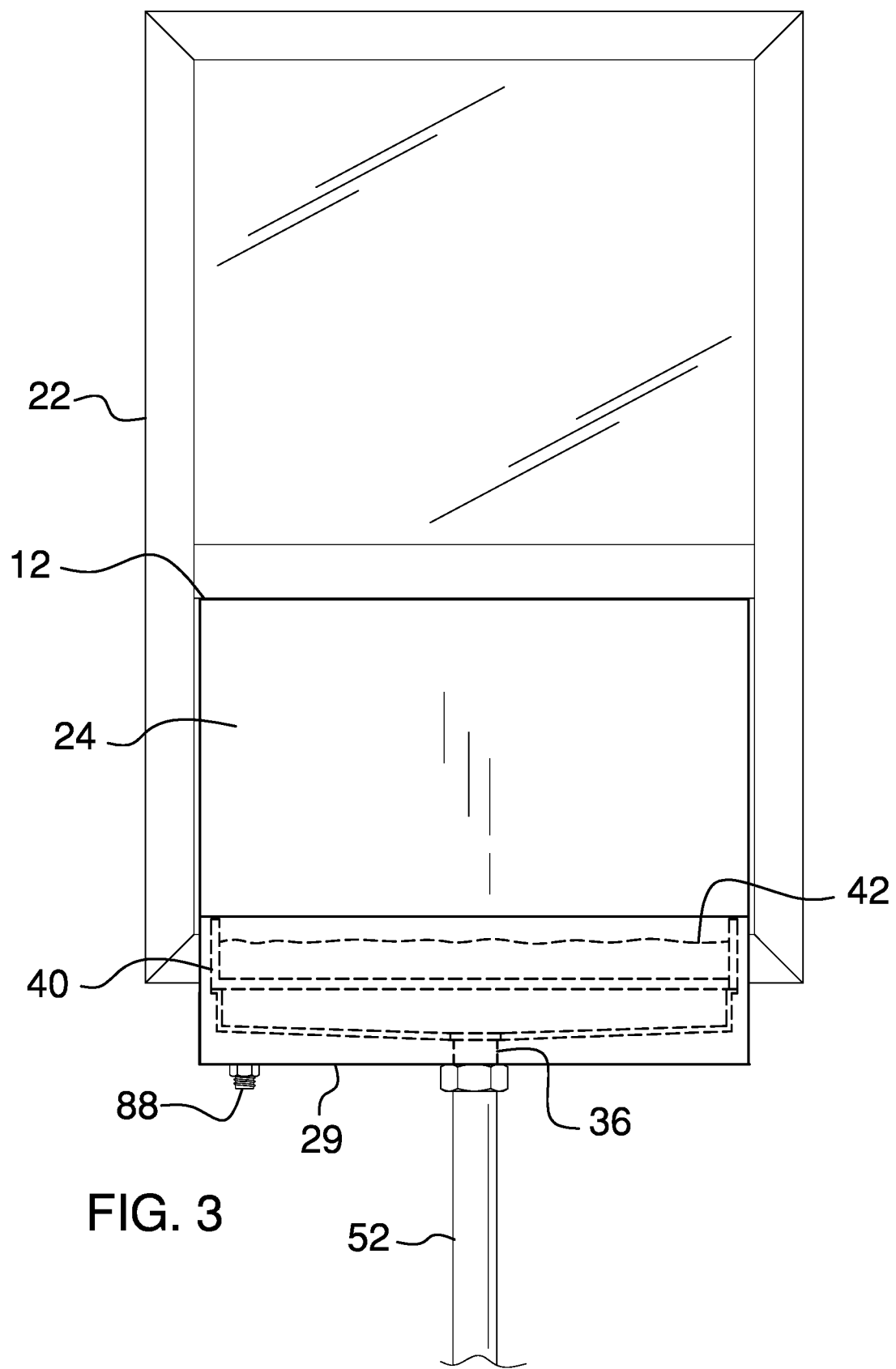
FIG. 3 is a back phantom view of an embodiment of the disclosure.
Figure 4:
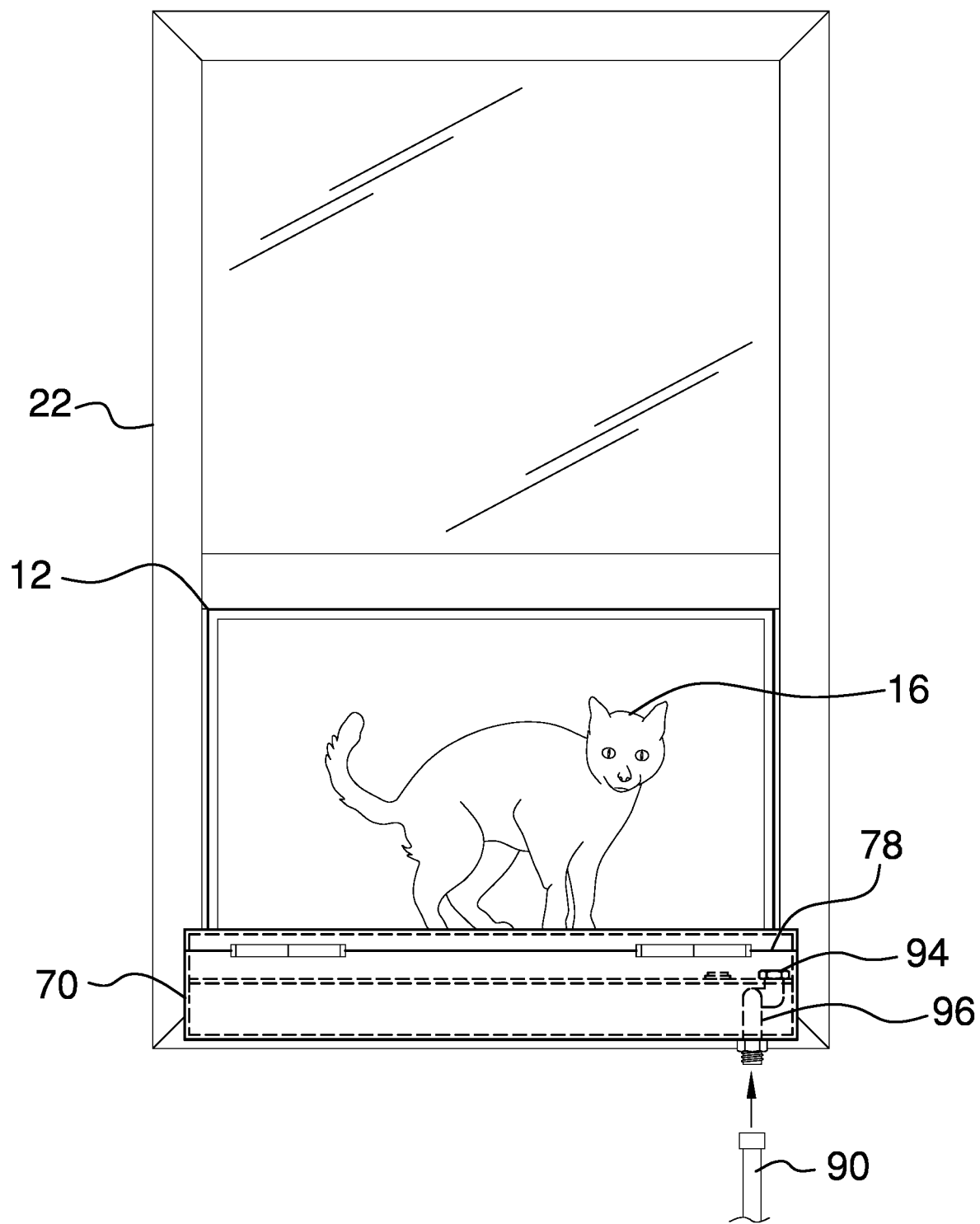
FIG. 4 is a front phantom view of an embodiment of the disclosure.
Figure 5:
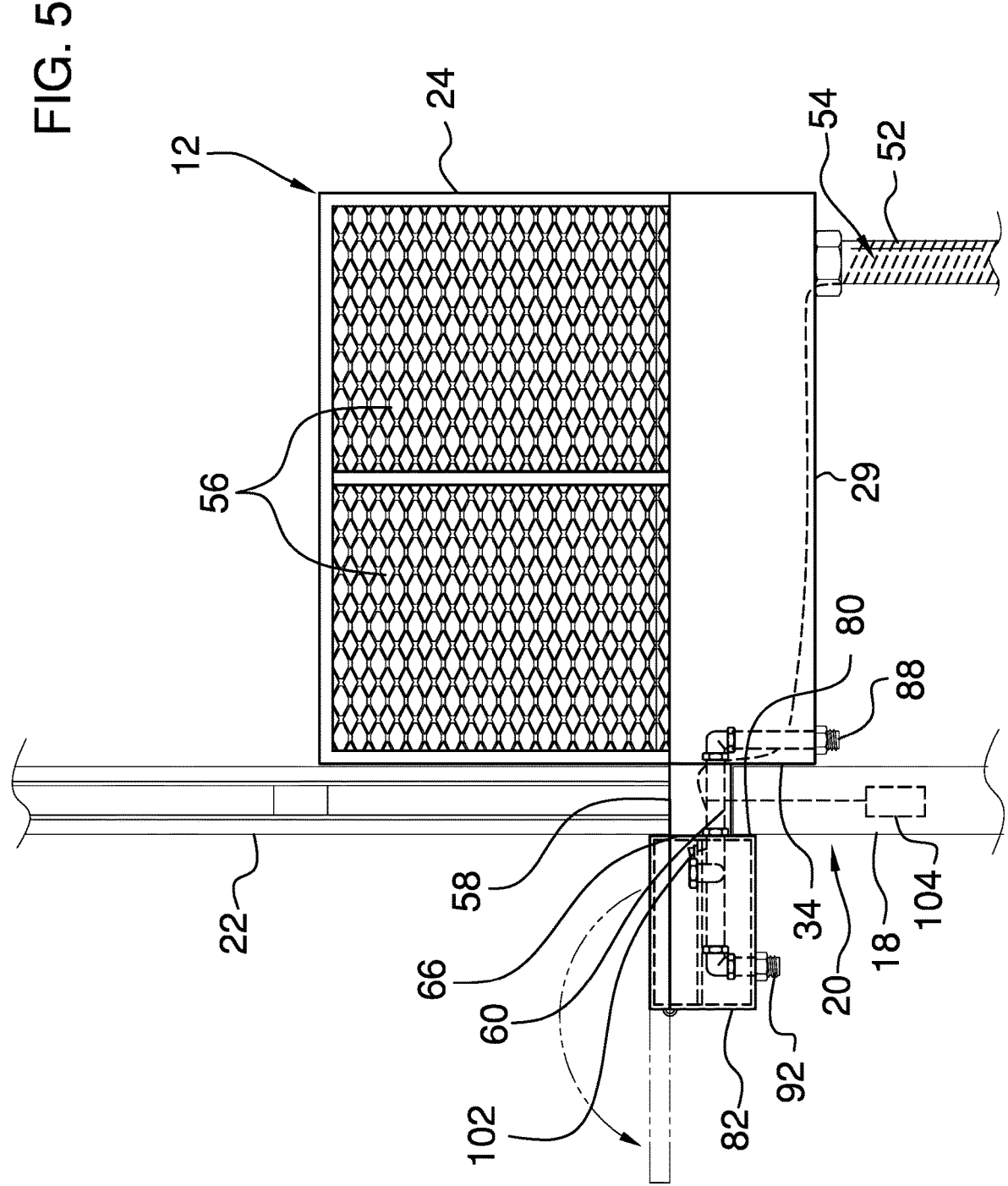
FIG. 5 is a left side phantom view of an embodiment of the disclosure.
Figure 6:
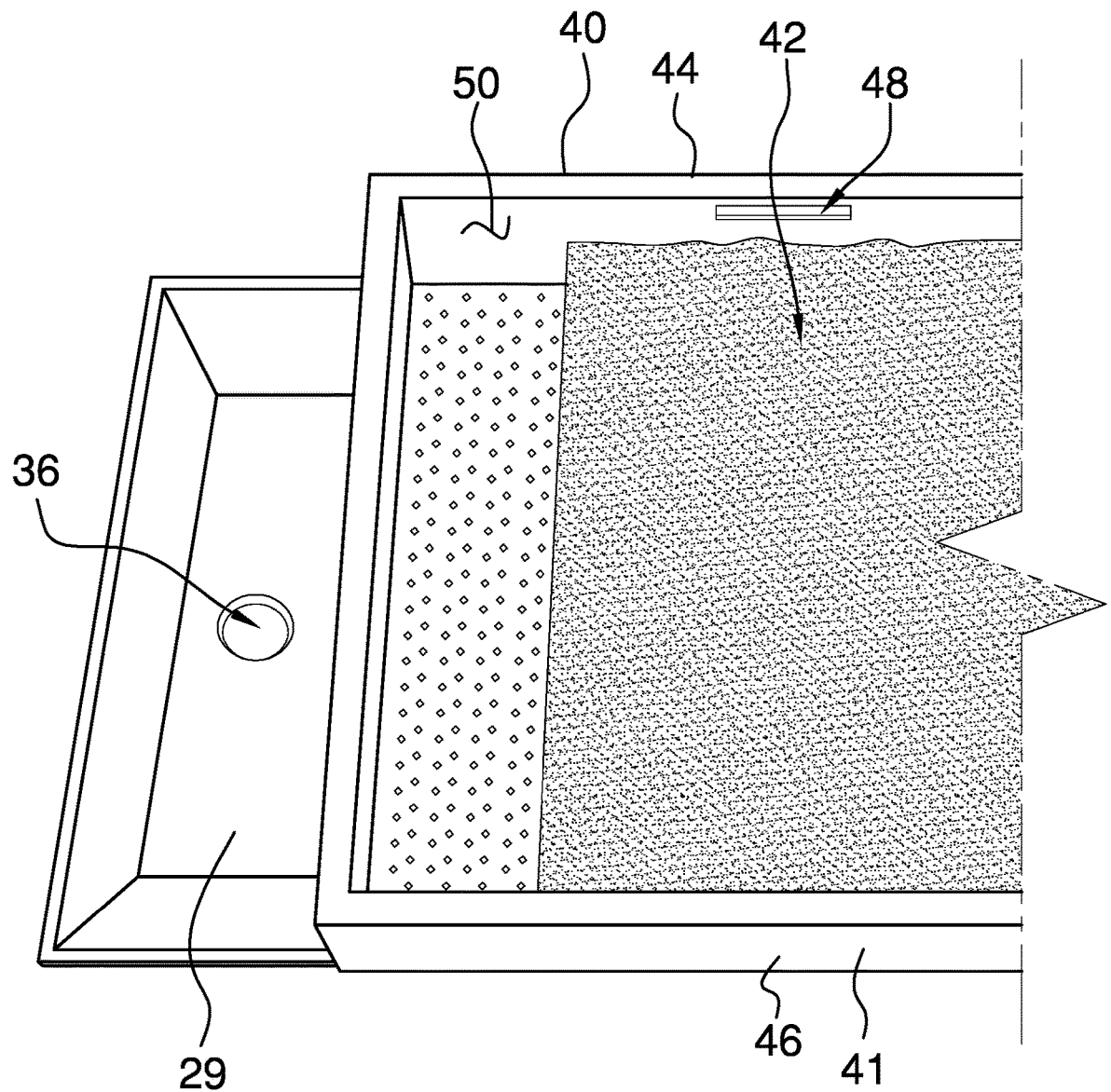
FIG. 6 is a top perspective view of a drip pan of an embodiment of the disclosure.

With reference now to the drawings, and in particular to FIGS. 1 through 6 thereof, a new litter housing device embodying the principles and concepts of an embodiment of the disclosure and generally designated by the reference numeral 10 will be described.

As best illustrated in FIGS. 1 through 6, the litter housing assembly 10 generally comprises a housing 12 that has an entry 14 thereby facilitating a feline 16 to enter the housing 12. The housing 12 is positioned against an exterior wall 18 of a building 20 having the entry 14 being aligned with a window 22 in the exterior wall 18. The building 20 may be a house or any other structure in which one or more felines resides as a domesticated pet. The housing 12 has a rear wall 24 and an outer wall 26 extending forwardly from the rear wall 24, and the outer wall 26 has a top side 28, a bottom side 29, a first lateral side 30, a second lateral side 32 and a front side 34. The entry 14 extends through the front side 34 and the entry 14 extends from the top side 28 toward the bottom side 29 of the outer wall 26. A drain 36 is integrated into the bottom side 29 of the outer wall 26 to drain fluid from the housing 12. The bottom side 29 of the outer wall 26 slopes downwardly toward the drain 36 to facilitate the fluid to run toward the drain 36, and the drain 36 is positioned adjacent to the rear wall 24. The housing 12 has a plurality of openings 38 each extending through a respective one of the first lateral side 30 and the second lateral side 32 of the outer wall 26 to ventilate the housing 12, and each of the openings 38 extends from the top side 28 toward the bottom side 29.

A drip pan 40 is positioned in the housing 12 and the drip pan 40 is foraminous to facilitate fluid to pass through the drip pan 40. Cat litter 42 is positioned on the drip pan 40 to facilitate the feline 16 to urinate and defecate in the cat litter 42. Furthermore, the cat litter 42 is comprised of a fluid impermeable material to resist absorbing urine from the feline 16. The drip pan 40 is spaced upwardly from the bottom side 29 of the outer wall 26 of the housing 12, and a perimeter wall 41 of the drip pan 40 abuts the rear wall 24 of the housing 12 and the first lateral side 30 and the second lateral side 32 and the front side 34 of the outer wall 26 of the housing 12. The perimeter wall 41 has a first sidelong side 44 and a second sidelong side 46, and the perimeter wall 41 has a pair of notches 48 each being integrated into a respective one of the first sidelong side 44 and the second sidelong side 46. Each of the notches 48 is positioned in an inwardly facing surface 50 of the respective first sidelong side 44 and the second sidelong side 46 thereby facilitating each of the notches 48 to be gripped for lifting the drip pan 40.

A drain pipe 52 is fluidly coupled to the bottom side 29 of the outer wall 26 of the housing 12 and the drain pipe 52 is aligned with the drain 36 in the bottom side 29 to drain fluid from the housing 12. A heating coil 54 is integrated into the drain pipe 52 and the heating coil 54 is in thermal communication with the drain pipe 52. Moreover, the heating coil 54 heats the drain pipe 52 when the heating coil 54 is turned on for inhibiting ice from forming in the drain pipe 52. The heating coil 54 may be an electric heating coil or the like and the heating coil 54 may have an operational temperature sufficient to raise the temperature of the drain pipe 52 above the freezing point of water.

A plurality of mesh screens 56 is provided and each of the mesh screens 56 is coupled to the outer wall 26 of the housing 12. Each of the mesh screens 56 completely covers a respective one of the openings 38 in the outer wall 26. Additionally, each of the mesh screens 56 is comprised of a fluid permeable material to pass air through the mesh screens 56. A threshold 58 extends away from the housing 12 thereby facilitating the threshold 58 to rest on a sill 60 of the window 22 in the exterior wall 18 of the building 20. The threshold 58 is positioned on the front side 34 of the outer wall 26 of the housing 12 and the threshold 58 has a top surface 62, a bottom surface 64 and a distal end 66 with respect to the front side 34. The top surface 62 is aligned with a lower bounding edge 68 of the entry 14 and the bottom surface 64 rests on the sill 60 of the window 22.

A box 70 is coupled to the threshold 58 and the box 70 has a bottom wall 72, a top wall 74 and an exterior wall 76 extending between the bottom wall 72 and the top wall 74. The exterior wall 76 extends upwardly beyond the top wall 74 to define a lip 78 extending around the box 70. The exterior wall 76 has a back side 80 and a front side 82, and the back side 80 is attached to the distal end 66 of the threshold 58. A lid 84 is hingedly coupled to the box 70 for opening and closing the box 70. The lid 84 has a front edge 86 and the front edge 86 is hingedly coupled to the lip 78 defined by the exterior wall 76 of the box 70 corresponding to the front side 34 of the exterior wall 76.

A first fluid input 88 is integrated into the box 70 such that the first fluid input 88 is positioned inside of the building such that the first fluid input 88 can be fluidly coupled to a fluid source 90 located inside of the building. The first fluid input 88 extends through the bottom wall 72 of the box 70. A second fluid input 92 is integrated into the housing 12 such that the second fluid input 92 is positioned outside of the building 20 and the second fluid input 92 can be fluidly coupled to a fluid source 90 located outside of the building 20. The second fluid input 92 extends through the bottom side 29 of the outer wall 26 of the housing 12. The fluid source 90 may be a water hose 98 or the like and the fluid delivered from the fluid source 90 may be water.

A fluid output 94 is integrated into the box 70 and a fluid pipe 96 is positioned in the box 70. The fluid pipe 96 is fluidly coupled to each of the first fluid input 88 and the second fluid input 92 and the fluid output 94. In this way the fluid pipe 96 can direct the fluid from either of the first fluid input 88 or the second fluid input 92 into the fluid output 94. A hose 98 is fluidly attached to the fluid output 94 such that the hose 98 can receive the fluid from the fluid output 94. A spray nozzle 100 is fluidly attached to the hose 98 to spray the fluid onto the cat litter 42 for washing the cat litter 42. A power button 102 is movably integrated into the top wall 74 of the box 70 and the power button 102 is electrically coupled to the heating coil 54 for turning the heating coil 54 on and off. Additionally, the power button 102 is electrically coupled to a power source 104 comprising an electrical system of the building 20.

In use, the cat enters the housing 12 through the entry 14 thereby facilitating the cat to urinate or defecate in the cat litter 42 that is contained in the housing 12. In this way the housing 12 facilitates the feline 16 to feel as though they are urinating or defecating outdoors. Either the first fluid input 88 or the second fluid input 92 is fluidly coupled to the fluid source 90, depending on whether the fluid source 90 is located inside or outside of the building 20. The hose 98 is employed to rinse the cat litter 42 at regularly scheduled intervals to eliminate odors that result from feline urine and feces. Additionally, the feline urine and the fluid employed to rinse the cat litter 42 drains through the drain pipe 52. The window 22 can be can be opened or closed at any time during winter months, for example, to retain environmental conditions within the building. Additionally, the drip pan 40 can be lifted and removed from the housing 12 at any time for cleaning and servicing the drip pan 40.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A litter housing assembly being mountable in a window of a building to facilitate a feline to urinate and defecate outside, said assembly comprising:

a housing having an entry thereby facilitating a feline to enter said housing, said housing being positioned against an exterior wall of said building having said entry being aligned with a window in the exterior wall;

a drip pan being positioned in said housing, said drip pan being foraminous wherein said drip pan is configured to facilitate fluid to pass through said drip pan, said drip pan having cat litter being positioned on said drip pan wherein said drip pan is configured to facilitate the feline to urinate and defecate in said cat litter, said cat litter being comprised of a fluid impermeable material wherein said cat litter is configured to resist absorbing urine from the feline;

a threshold extending away from said housing thereby facilitating said threshold to rest on a sill of the window in the exterior wall of the building;

a box being coupled to said threshold;

a first fluid input being integrated into said box such that said first fluid input is positioned inside of the building wherein said first fluid input is configured to be fluidly coupled to a fluid source located inside of the building;

a second fluid input being integrated into said housing such that said second fluid input is positioned outside of the building wherein said second fluid input is configured to be fluidly coupled to a fluid source located outside of the building;

a fluid output being integrated into said box;

a hose being fluidly attached to said fluid output wherein said hose is configured to receive the fluid from said fluid output, said hose having a spray nozzle being fluidly attached to said hose wherein said spray nozzle is configured to spray the fluid onto the cat litter for washing the cat litter.

2. The assembly according to claim 1, wherein:

said housing has a rear wall and an outer wall extending forwardly from said rear wall, said outer wall having a top side, a bottom side, a first lateral side, a second lateral side and a front side, said entry extending through said front side, said entry extending from said top side toward said bottom side;

said housing has a drain being integrated into said bottom side of said outer wall wherein said drain is configured to drain fluid from said housing;

said bottom side of said outer wall slopes downwardly toward said drain wherein said bottom side is configured to facilitate the fluid to run toward said drain, said drain being positioned adjacent to said rear wall; and said housing has a plurality of openings each extending through a respective one of said first lateral side and said second lateral side of said outer wall to ventilate said housing, each of said openings extending from said top side toward said bottom side.

3. The assembly according to claim 2, wherein:

said drip pan is spaced upwardly from said bottom side of said outer wall of said housing, a perimeter wall of said drip pan abutting said rear wall and said first lateral side and said second lateral side and said front side of said outer wall of said housing, said perimeter wall having a first sidelong side and a second sidelong side; and said perimeter wall has a pair of notches each being integrated into a respective one of said first sidelong side and said second sidelong side, each of said notches being positioned in an inwardly facing surface of said respective first sidelong side and said second sidelong side thereby facilitating each of said notches to be gripped for lifting said drip pan.

4. The assembly according to claim 2, further comprising:

a drain pipe being fluidly coupled to said bottom side of said outer wall of said housing, said drain pipe being aligned with said drain in said bottom side wherein said drain pipe is configured to drain the fluid; and a heating coil being integrated into said drain pipe, said heating coil being in thermal communication with said drain pipe, said heating coil heating said drain pipe when said heating coil is turned on for inhibiting ice from forming in said drain pipe.

5. The assembly according to claim 2, further comprising a plurality of mesh screens, each of said mesh screens being coupled to said outer wall of said housing, each of said mesh screens completely covering a respective one of said openings in said outer wall, each of said mesh screens being comprised of a fluid permeable material wherein each of said mesh screens is configured to pass air through said mesh screens.

6. The assembly according to claim 2, wherein said threshold is positioned on said front side of said outer wall of said housing, said threshold having a top surface, a bottom surface and a distal end with respect to said front side, said top surface being aligned with a lower bounding edge of said entry, said bottom surface resting on the sill of the window.

7. The assembly according to claim 6, wherein:

said box has a bottom wall, a top wall and an exterior wall extending between said bottom wall and said top wall, said exterior wall extending upwardly beyond said top wall to define a lip extending around said box, said exterior wall having a back side and a front side, said back side being attached to said distal end of said threshold; and said assembly includes a lid being hingedly coupled to said box for opening and closing said box, said lid having a front edge, said front edge being hingedly coupled to said lip defined by said exterior wall of said box corresponding to said front side of said exterior wall.

8. The assembly according to claim 1, further comprising a fluid pipe being positioned in said box, said fluid pipe being fluidly coupled to each of said first fluid input and said second fluid input and said fluid output wherein said fluid pipe is configured to direct a fluid from either of said first fluid input or said second fluid input to said fluid output.

9. A litter housing assembly being mountable in a window of a building to facilitate a feline to urinate and defecate outside, said assembly comprising:

a housing having an entry thereby facilitating a feline to enter said housing, said housing being positioned against an exterior wall of said building having said entry being aligned with a window in the exterior wall, said housing having a rear wall and an outer wall extending forwardly from said rear wall, said outer wall having a top side, a bottom side, a first lateral side, a second lateral side and a front side, said entry extending through said front side, said entry extending from said top side toward said bottom wall, said housing having a drain being integrated into said bottom side of said outer wall wherein said drain is configured to drain fluid from said housing, said bottom side of said outer wall sloping downwardly toward said drain wherein said bottom side is configured to facilitate the fluid to run toward said drain, said drain being positioned adjacent to said rear wall, said housing having a plurality of openings each extending through a respective one of said first lateral side and said second lateral side of said outer wall to ventilate said housing, each of said openings extending from said top side toward said bottom side;

a drip pan being positioned in said housing, said drip pan being foraminous wherein said drip pan is configured to facilitate fluid to pass through said drip pan, said drip pan having cat litter being positioned on said drip pan wherein said drip pan is configured to facilitate the feline to urinate and defecate in said cat litter, said cat litter being comprised of a fluid impermeable material wherein said cat litter is configured to resist absorbing urine from the feline, said drip pan being spaced upwardly from said bottom side of said outer wall of said housing, a perimeter wall of said drip pan abutting said rear wall of said housing and said first lateral side and said second lateral side and said front side of said outer wall of said housing, said perimeter wall having a first sidelong side and a second sidelong side, said perimeter wall having a pair of notches each being integrated into a respective one of said first sidelong side and said second sidelong side, each of said notches being positioned in an inwardly facing surface of said respective first sidelong side and said second sidelong side thereby facilitating each of said notches to be gripped for lifting said drip pan;

a drain pipe being fluidly coupled to said bottom side of said outer wall of said housing, said drain pipe being aligned with said drain in said bottom side wherein said drain pipe is configured to drain the fluid;

a heating coil being integrated into said drain pipe, said heating coil being in thermal communication with said drain pipe, said heating coil heating said drain pipe when said heating coil is turned on for inhibiting ice from forming in said drain pipe;

a plurality of mesh screens, each of said mesh screens being coupled to said outer wall of said housing, each of said mesh screens completely covering a respective one of said openings in said outer wall, each of said mesh screens being comprised of a fluid permeable material wherein each of said mesh screens is configured to pass air through said mesh screens;

a threshold extending away from said housing thereby facilitating said threshold to rest on a sill of the window in the exterior wall of the building, said threshold being positioned on said front side of said outer wall of said housing, said threshold having a top surface, a bottom surface and a distal end with respect to said front side, said top surface being aligned with a lower bounding edge of said entry, said bottom surface resting on the sill of the window;

a box being coupled to said threshold, said box having a bottom wall, a top wall and an exterior wall extending between said bottom wall and said top wall, said exterior wall extending upwardly beyond said top wall to define a lip extending around said box, said exterior wall having a back side and a front side, said back side being attached to said distal end of said threshold;

a lid being hingedly coupled to said box for opening and closing said box, said lid having a front edge, said front edge being hingedly coupled to said lip defined by said exterior wall of said box corresponding to said front side of said exterior wall;

a first fluid input being integrated into said box such that said first fluid input is positioned inside of the building wherein said first fluid input is configured to be fluidly coupled to a fluid source located inside of the building, said first fluid input extending through said bottom wall of said box;

a second fluid input being integrated into said housing such that said second fluid input is positioned outside of the building wherein said second fluid input is configured to be fluidly coupled to a fluid source located outside of the building, said second fluid input extending through said bottom side of said outer wall of said housing;

a fluid output being integrated into said box;

a fluid pipe being positioned in said box, said fluid pipe being fluidly coupled to each of said first fluid input and said second fluid input and said fluid output wherein said fluid pipe is configured to direct a fluid from either of said first fluid input or said second fluid input to said fluid output;

a hose being fluidly attached to said fluid output wherein said hose is configured to receive the fluid from said fluid output, said hose having a spray nozzle being fluidly attached to said hose wherein said spray nozzle is configured to spray the fluid onto the cat litter for washing the cat litter; and a power button being movably integrated into said top wall of said box, said power button being electrically coupled to said heating coil for turning said heating coil on and off, said power button being electrically coupled to a power source comprising an electrical system of the building.

\* \* \* \* \*